United States Patent
Gozu

(10) Patent No.: US 10,832,438 B2
(45) Date of Patent: Nov. 10, 2020

(54) OBJECT DISTANCING SYSTEM FOR A VEHICLE

(71) Applicant: Murat Gozu, Auburn Hills, MI (US)

(72) Inventor: Murat Gozu, Auburn Hills, MI (US)

(*) Notice: Subject to any disclaimer, the term of this patent is extended or adjusted under 35 U.S.C. 154(b) by 100 days.

(21) Appl. No.: 16/225,024

(22) Filed: Dec. 19, 2018

(65) Prior Publication Data

US 2020/0202549 A1  Jun. 25, 2020

(51) Int. Cl.
| | |
|---|---|
| *G06T 7/70* | (2017.01) |
| *B60W 30/16* | (2020.01) |
| *G05D 1/02* | (2020.01) |
| *B60W 40/04* | (2006.01) |
| *G01S 17/931* | (2020.01) |

(52) U.S. Cl.
CPC ............ *G06T 7/70* (2017.01); *B60W 30/16* (2013.01); *B60W 40/04* (2013.01); *G01S 17/931* (2020.01); *G05D 1/0248* (2013.01); *G05D 2201/0213* (2013.01); *G06T 2207/10028* (2013.01); *G06T 2207/30261* (2013.01)

(58) Field of Classification Search
CPC ............ G06T 7/70; G06T 2207/30261; G06T 2207/10028; G01S 17/931; G05D 1/0248; G05D 2201/0213; B60W 30/16; B60W 40/04
See application file for complete search history.

(56) References Cited

U.S. PATENT DOCUMENTS

| | | | |
|---|---|---|---|
| 7,202,776 B2 | 4/2007 | Breed | |
| 7,218,385 B2 | 5/2007 | Takagi | |
| 9,286,536 B2 | 2/2016 | Loria et al. | |
| 2015/0203108 A1* | 7/2015 | Loria | B60W 50/0098 701/93 |
| 2016/0144770 A1* | 5/2016 | Graf | G01S 17/931 362/464 |
| 2016/0227188 A1* | 8/2016 | Aoki | G06K 9/52 |
| 2016/0240085 A1* | 8/2016 | Otsuka | H04N 5/243 |
| 2018/0165822 A1* | 6/2018 | Uliyar | G06K 9/00798 |

FOREIGN PATENT DOCUMENTS

CN   205946032 U   2/2017

* cited by examiner

*Primary Examiner* — Neil R McLean

(57) ABSTRACT

A vehicle includes a first laser module configured to emit a first light beam and project a first dot onto a preceding vehicle, a second laser module configured to emit a second light beam and project a second dot onto the preceding vehicle, a camera configured to generate a digital image of the first and second dots projected onto the preceding vehicle, and a controller configured to determine, from the digital image, a width between the first and second dots, and subsequently determine a following distance between the vehicle and the preceding vehicle based on linear interpolation using the determined width.

16 Claims, 5 Drawing Sheets

OBJECT DISTANCING SYSTEM FOR A VEHICLE

FIELD

The present application relates generally to object distancing systems for vehicles and, more particularly, to a vehicle distancing system utilizing dot lasers.

BACKGROUND

Typical vehicles can include driver assistance systems which use forward sensors to assist in control of the vehicle and/or provide feedback or warnings based on objects in the vehicle's path. One type of system is known as a passive driver assistance system, which provides feedback or warnings to a driver but does not directly control the vehicle. Another type of system is an active driver assistance system, which not only provides warnings, but also actively controls the vehicle under certain conditions.

An example of a passive driver assistance system is a forward collision warning system, which uses radar and sometimes laser sensors to detect an imminent collision, and subsequently warns a driver that an object is present in front of the vehicle, but requires that the driver, not the system, operate the vehicle so as to avoid the collision. Depending on how the system is implemented, the system may warn the driver, precharge the brakes, inflate seats for extra support, move the passenger seat, position head rests to avoid whip lash, tension seat belts and/or automatically apply braking to minimize impact. The warning or feedback features of passive driver assistance systems may optionally be disabled, even while the passive driver assistance system continues to collect data regarding driving conditions.

Examples of active driver assistance systems include adaptive cruise control and adaptive cruise control with a stop and go feature. Adaptive cruise control, sometimes referred to as active cruise control, automatically reduces the vehicle's speed when a slower vehicle appears in the lane ahead to ensure that the cruise controlled vehicle is at a safe following distance. The adaptive cruise control system will accelerate the vehicle back to its set cruise control speed when the lane becomes free or the distance between the two vehicles increases to the safe following distance. An adaptive cruise control system with a stop and go feature will apply the vehicle's brakes until the vehicle comes to a stop (if necessary) before allowing the vehicle to go off again when the traffic ahead moves.

However, the above-noted driving assist systems can be extremely complex and require expensive equipment. Thus, while current systems do work well for their intended purpose, there remains a need for improvement in the relevant art.

SUMMARY

In one example aspect of the invention, a vehicle is provided. In one example implementation, the vehicle includes a first laser module configured to emit a first light beam and project a first dot onto a preceding vehicle, a second laser module configured to emit a second light beam and project a second dot onto the preceding vehicle, a camera configured to generate a digital image of the first and second dots projected onto the preceding vehicle, and a controller configured to determine, from the digital image, a width between the first and second dots, and subsequently determine a following distance between the vehicle and the preceding vehicle based on linear interpolation using the determined width.

In addition to the foregoing, the described vehicle may include one or more of the following: wherein the width between the first and second dot is determined in pixels; wherein determining the following distance based on linear interpolation further includes using a predetermined second pixel width and second distance, and a predetermined third pixel width and third distance; wherein the first and second laser modules are infrared laser modules; and wherein the camera is a night vision camera configured to detect infrared light emitted from the first and second infrared laser modules.

In addition to the foregoing, the described vehicle may include one or more of the following: wherein the controller determines the following distance based on linear interpolation using the equation $$\frac{X1-X2}{d2-d1} = \frac{X1-X}{d-d1},$$

where 'X' is a number of pixels wide at following distance 'd', 'X1' is a number of pixels wide at a first predetermined range 'd1', 'X2' is a number of pixels wide at a second predetermined range 'd2', 'd' is the following distance to be determined, and 'd1' and 'd2' are the known ranges.

In addition to the foregoing, the described vehicle may include one or more of the following: wherein the controller is a driver assistance system module (DASM) of a driver assistance system, wherein the DASM is in signal communication with the camera and the first and second laser modules; wherein the DASM is in signal communication with a powertrain control module (PCM), a transmission control module (TCM) and a brake system module (BSM), the DASM configured to utilize the determined following distance to facilitate operation of an adaptive cruise control (ACC) system and/or an automated emergency braking (AEB) system; and wherein the first and second laser modules are positioned adjacent headlights of the vehicle, and the camera is positioned adjacent a rearview mirror of the vehicle.

In accordance with another example aspect of the invention, a method of controlling a vehicle having a driver assist system with first and second laser modules and a camera is provided. In one example implementation, the method includes emitting a first beam of light from the first laser module to project a first dot onto a preceding vehicle, emitting a second beam of light from the second laser module to project a second dot onto the preceding vehicle, generating, with the camera, a digital image of the first and second dots projected onto the preceding vehicle, determining, with a controller, a width between the first and second dot on the digital image, and determining, with the controller, a following distance between the vehicle and the preceding vehicle based on linear interpolation using the determined width.

In addition to the foregoing, the described method may include one or more of the following: wherein the width is determined in pixels; wherein the following distance is further determined using a predetermined second pixel width and second distance, and a predetermined third pixel width and third distance; wherein the steps of emitting first and second beams of light comprises emitting first and second beams of infrared light; and wherein determining the following distance based on linear interpolation comprises using the equation $$\frac{X1 - X2}{d2 - d1} = \frac{X1 - X}{d - d1},$$

where 'X' is a number of pixels wide at following distance 'd', 'X1' is a number of pixels wide at a first predetermined range 'd1', 'X2' is a number of pixels wide at a second predetermined range 'd2', 'd' is the following distance to be determined, and 'd1' and 'd2' are the predetermined ranges.

In addition to the foregoing, the described method may include one or more of the following: wherein the controller is a driver assistance system module (DASM) of the driver assistance system, wherein the DASM receives one or more digital image from the camera to determine the width between the first and second dot; and controlling, with the DASM, at least one of a powertrain control module (PCM), a transmission control module (TCM), and a brake system module (BSM), based on the determined following distance to facilitate operation of at least one of an adaptive cruise control (ACC) system and an automated emergency braking (AEB) system.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

The present application is generally directed to systems and methods for determining a following distance between a follow vehicle and a preceding vehicle. The systems utilize dot-type laser modules, a camera, and a computational unit (e.g., a driving assist controller). The laser modules project two dots onto the preceding vehicle and the camera detects the reflections of those two dots. The computational unit calculates the pixelated distance between the two dots and, along with known ranges, determines the distance to the preceding vehicle based on linear interpolation.

Figure 1:
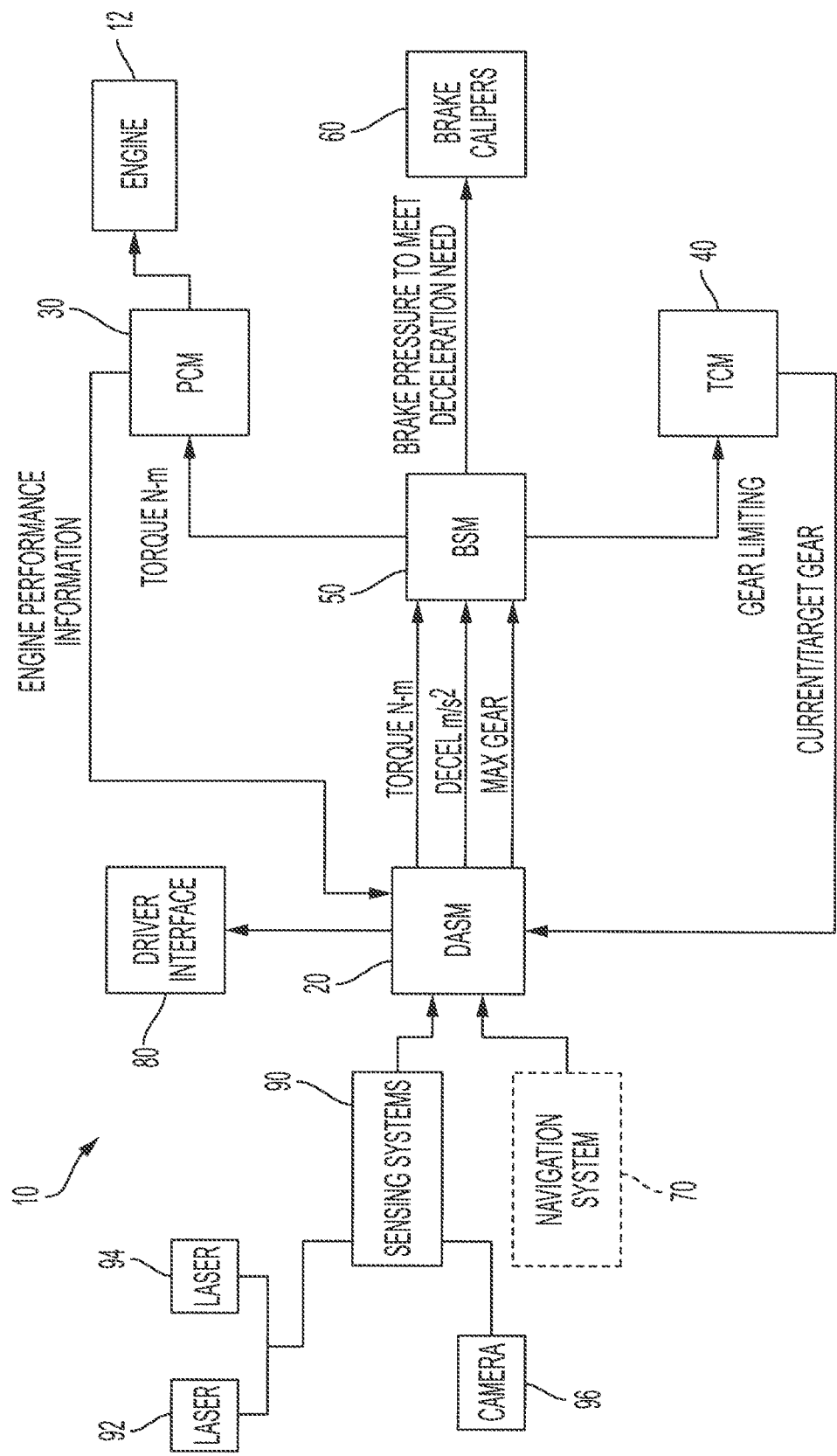
FIG. 1 is a schematic diagram of an example driver assistance system in accordance with the principles of the present disclosure.

Referring to FIG. 1, an example driver assistance system is generally shown and indicated at reference numeral 10. In the example embodiment, system 10 generally includes an engine 12 and a drivers assistance system module (DASM) 20. The DASM 20 could be a processor programmed to perform the methods described herein and/or other necessary controller functions. As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

In the example embodiment, the DASM 20 receives information from the engine 12 or other control modules. For example, as shown in FIG. 1, the DASM 20 receives information from a powertrain control module (PCM) 30 configured to control the engine 12 (for example, by controlling a throttle). The engine performance information received from the PCM 30 may include, for example, engine speed. The DASM 20 also receives information from a transmission control module (TCM) 40. The information received from the TOM 40 may include the vehicle's current gear or a target gear, for example. The DASM 20 could also receive information from other control modules. The DASM 20 acts upon the information received from the PCM 30 and TCM 40, for example, and outputs its own control signals in order to alter vehicle performance.

In the example embodiment, the DASM 20 outputs control signals to a brake system module (BSM) 50, which itself outputs signals to other control modules. For example, the DASM 20 can output a control signal to limit the engine torque. The torque control signal is output from the DASM 20 to the BSM 50, which then instructs the PCM 30 accordingly so that operation of the engine 12 may be appropriately altered. As another example, the DASM 20 can output a control signal to limit the maximum gear to be used by the vehicle's transmission. The maximum gear control signal is output from the DASM 20 to the BSM 50, which then instructs the TCM 40 so as to limit the gears used by the transmission. The DASM 20 could also output a deceleration control signal. This signal would be received by the BSM 50, which would then output a corresponding brake pressure command to the vehicle's brake calipers 60.

It will be appreciated that the control signals output by the DASM 20 are not limited to those illustrated in FIG. 1 and could include additional control signals output to either the BSM 50 or to other vehicle systems. The control signals are generated either by the DASM 20 or by a cruise control function within the DASM 20. It should be noted that the cruise control function could be a separate module/component of the system 10, if desired.

The DASM 20 may be optionally connected to a navigation system 70 or one or more navigation data sources (e.g., compass or GPS receiver). The navigation system 70 could provide useful information to the DASM 20 such as, for example, a speed limit for the road being traveled. The DASM 20 is also connected to a driver interface 80, which may be part of the vehicle's dashboard display, on-board menus, and/or audio sound system. The DASM 20 can send warning signals to the driver interface 80 to alert the driver of an imminent collision.

Although not shown, the DASM 20 can be connected to other in-cabin components so that it can inflate seats, move the passenger seat, position head rests to avoid whip lash, and/or tension seat belts seats as part of a forward collision warning or perform some of the functions described below. Moreover, it should be appreciated that FIG. 1 illustrates one example system 10 and the principles disclosed herein are not limited solely to the FIG. 1 illustrated configuration.

Figure 2:
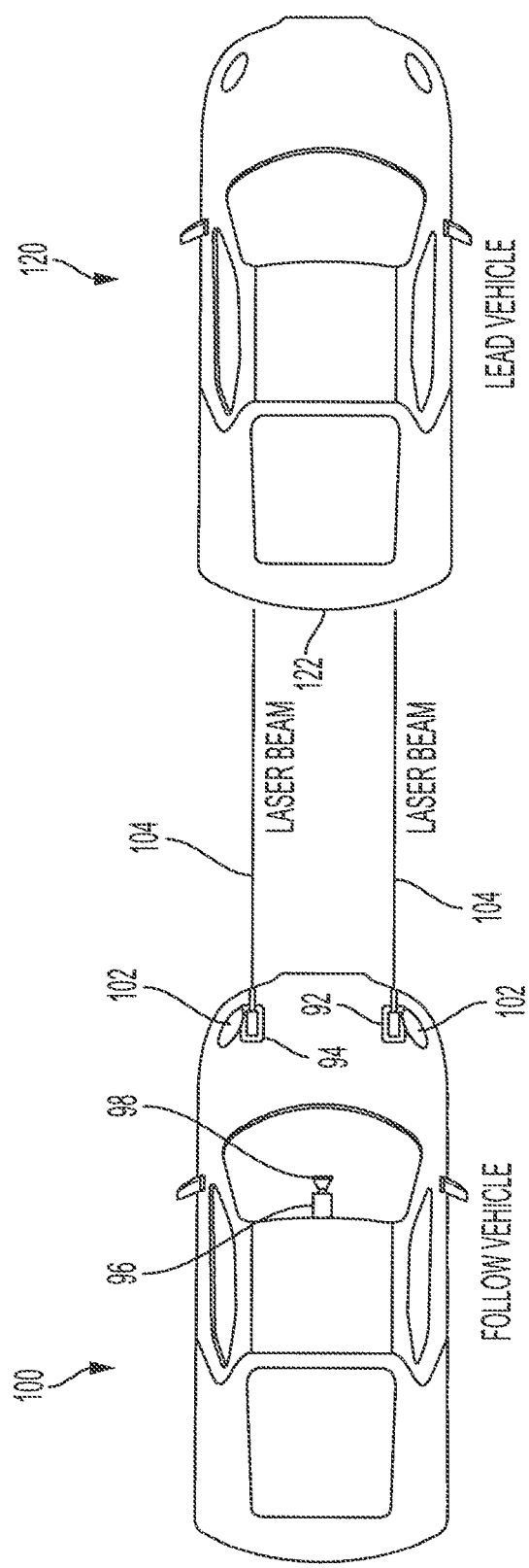
FIG. 2 is a top view of an example vehicle with the driver assistance system shown in FIG. 1 and following a preceding vehicle, in accordance with the principles of the present disclosure.

With additional reference to FIG. 2, in the example embodiment, the DASM 20 is also coupled to a sensing system 90, which generally includes a pair of invisible infrared dot-type laser modules 92, 94 and a night vision camera 96. In one example, the laser modules 92, 94 are disposed on a front of a vehicle 100 and produce an infrared laser with a wave length more than 700 nm, and the night vision camera 96 is disposed adjacent a rearview mirror or windshield of the vehicle 100.

In the illustrated example, the laser modules 92, 94 are oriented adjacent the vehicle head lamps 102 and are configured to emit a laser beam 104 onto a lead vehicle 120 preceding the trail or follow vehicle 100. The night vision camera 96 is configured to detect the infrared light emitted from the laser modules 92, 94 and reflected off of the preceding vehicle 120. In the example embodiment, the night vision camera 96 includes a lens 98 configured to facilitate detecting the laser reflections at long distances (e.g., 300 yards).

It will be appreciated that the sensing system 90 can include additional sensors such as, for example, radar, lidar, forward vision (camera), and ultrasonic sensors. As described herein, the sensing system 90 is configured to provide the DASM 20 with data and information needed to make following/stopping distance determinations and or other determinations.

With additional reference to FIGS. 3-8, an example method 200 of gathering and processing information used in the system 10 is provided. The information is utilized to determine a following distance between the follow vehicle 100 and lead vehicle 120, which can then be used for the operation of driving assist systems such as, for example, adaptive cruise control (ACC) and automated emergency braking (AEB).

Figure 3:
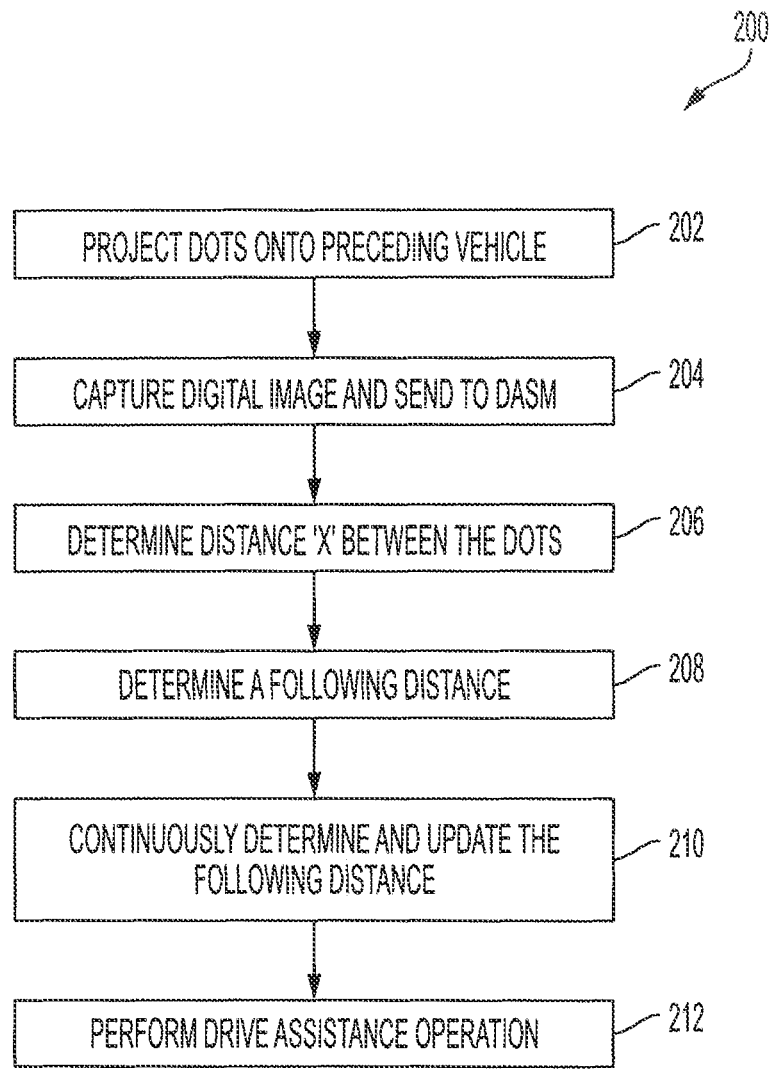
FIG. 3 is a flow diagram of an example method of gathering and processing information used in the system shown in FIG. 1, in accordance with the principles of the present disclosure.
Figure 4:
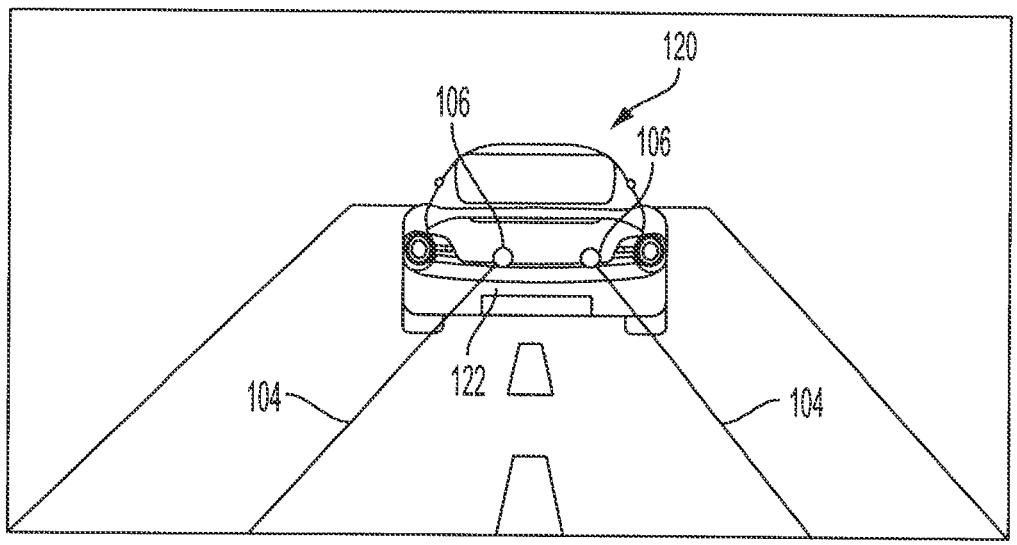
FIG. 4 is a schematic forward view from the follow vehicle shown in FIG. 2, in accordance with the principles of the present disclosure.
Figure 5:
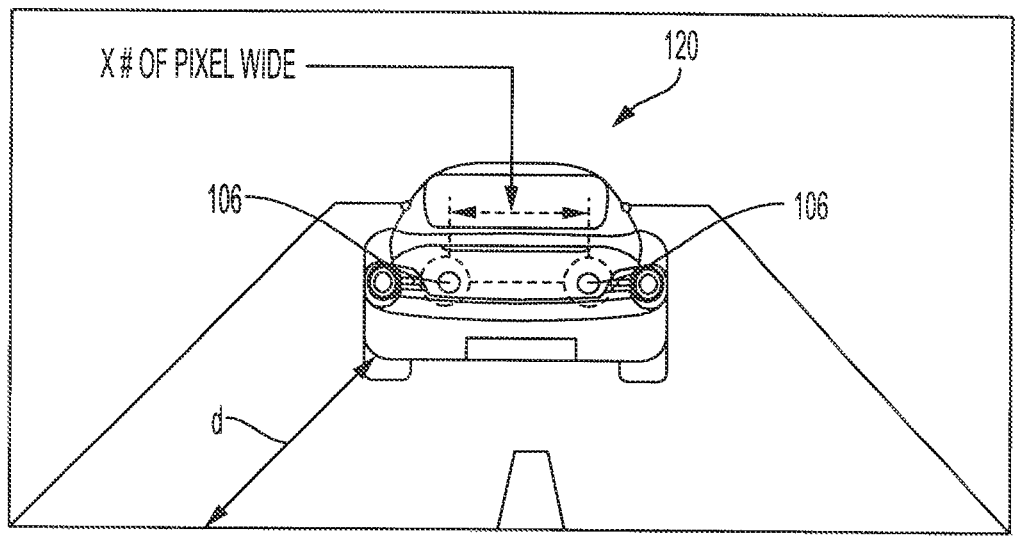
FIG. 5 is another schematic forward view from the follow vehicle shown in FIG. 2, in accordance with the principles of the present disclosure.
Figure 6:
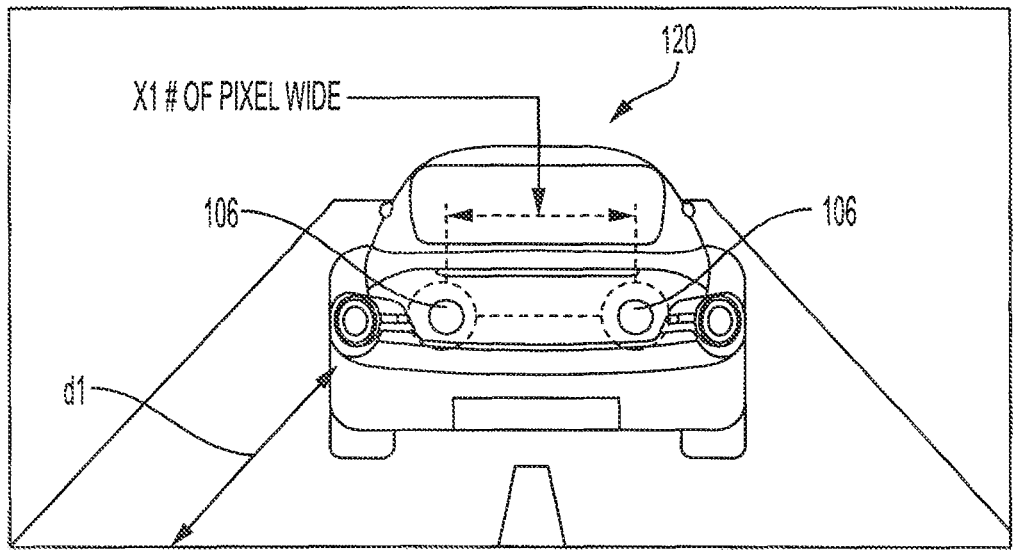
FIG. 6 is a schematic forward view from the follow vehicle shown in FIG. 2 determining a pixel width 'X1' at a known distance 'd1' in accordance with the principles of the present disclosure.
Figure 7:
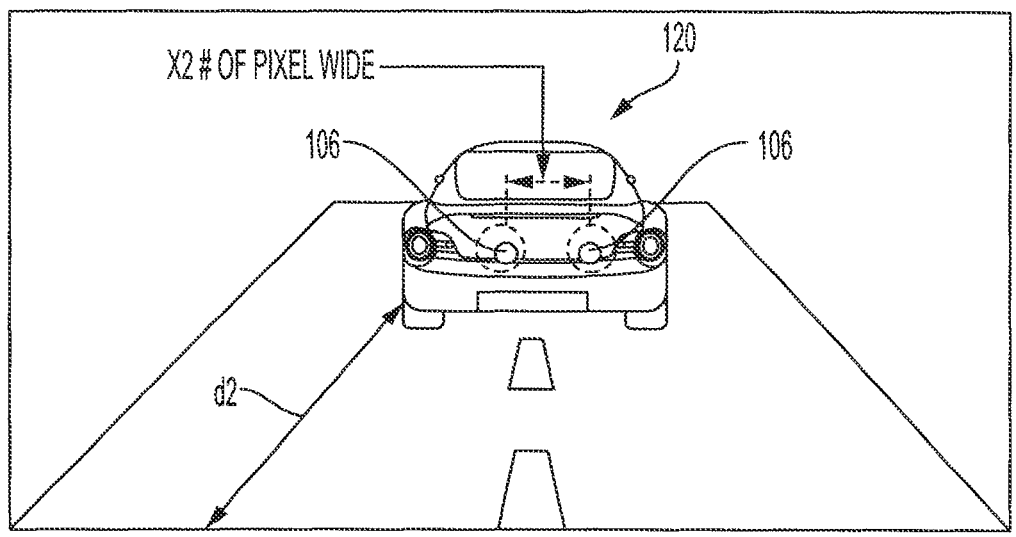
FIG. 7 is a schematic forward view from the follow vehicle shown in FIG. 2 determining a pixel width 'X2' at a known distance 'd2' in accordance with the principles of the present disclosure.

With reference to FIG. 3, in the example embodiment, the method begins at step 202 where the laser modules 92, 94 each emit a beam of light 104 onto the lead vehicle 120, which the follow vehicle 100 is traveling behind. As shown in FIG. 4, this results in two dots 106 being projected onto the rear 122 of the lead vehicle 120. At step 204, the night vision camera 96 captures one or more digital images of the reflection of the two dots 106, and subsequently sends a signal to the DASM 20 of the one or more digital pictures with the dots 106 projected onto the lead vehicle 120.

At step 206, the DASM 20 determines a distance 'X' between the two dots 106 in the one or more digital pictures. In the example embodiment, the digital pictures from camera 96 are made up a plurality of pixels, and the distance 'X' is determined in number of pixels (see FIG. 5). For example, distance 'X' may be 1,000 pixels measured between the two dots 106 in a particular digital image from the camera 96. In one example, the distance 'X' is measured between the centers of the dots 106. In other examples, the distance 'X' is measured between the inner facing edge of the dots 106.

At step 208, the DASM 20 then determines a following distance 'd' between the follow vehicle 100 and the lead vehicle 120 based on linear interpolation, using the equation:

$$\frac{X1 - X2}{d2 - d1} = \frac{X1 - X}{d - d1},$$

where 'X' is the number of pixels wide at following distance 'd' (from step 206), 'X1' is the number of pixels wide at a predetermined, known range 'd1' (e.g., can be chosen as a minimum range), 'X2' is the number of pixels wide at a predetermined, known range 'd2' (e.g., can be chosen as a maximum range), 'd' is the range or following distance to be determined, and 'd1' and 'd2' are the known ranges.

As noted above, pixel widths or distances 'X1' and 'X2' and predetermined ranges 'd1' and 'd2' are previously known and may be part of a lookup table stored in the DASM 20. In one example shown in FIGS. 6 and 7, these predetermined pixel distances and ranges are determined during a testing or calibration process where the ranges and 'd2' of the laser beams 104 are known and the pixel distances 'X1' and 'X2' are subsequently determined based on a digital picture from camera 96. As illustrated, the pixel distances 'X1' and 'X2' are determined at different ranges 'd1' and 'd2' so as to provide a correlation between range and pixel width.

At step 210, the DASM 20 continues to constantly determine and update the following distance 'd' in real time as the follow vehicle 100 and lead vehicle 120 move closer to or farther away from each other. As the vehicles 100, 120 move closer to each other, the measured pixel distance 'X' will increase. Similarly, as the vehicle 100, 120 move farther away from each other, the measured pixel distance 'X' will decrease. Moreover, as the DASM 20 determines more and more instances of following distance 'd' at moments in time, previously determined following distances 'd' can subsequently be used as one of the known, predetermined ranges 'd1' or 'd2' where the pixel distance is also known.

At step 212, the DASM 20 utilizes the determined following distance(s) 'd' to perform one or more drive assistance system operation such as, for example, adaptive cruise control or automated emergency braking. However, it will be appreciated that the determined following distance may be utilized by various other vehicle systems and/or systems related thereto. It will also be appreciated that since processing information from sensing systems 90 and performing calculations (e.g., following distances 'd') may require extra processing power in the DASM 20, the sensing systems 90 may alternatively/additionally include one or more dedicated controller or processor (not shown) such as, for example, a vision processor to perform one or more of the functions/duties described herein.

Described herein are systems and methods for determining a distance or range between two vehicles, which information is then utilized to perform various operations in a driver assistance system. The systems include a sensing system that includes a pair of infrared laser modules that project two dots onto a leading vehicle. A night vision camera detects the laser light reflections and determines a distance in pixels between the two dots. Using predetermined, known ranges and pixel widths, the current distance between the vehicles is determined using linear interpolation. Accordingly, such systems do not require measuring time of flight of electromagnetic waves between two vehicles and thus provide more cost effective ranging solutions than radar and lidar.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A vehicle comprising:
   a first laser disposed on a front of the vehicle and oriented to emit a first light beam and project a first dot onto a preceding vehicle;
   a second laser disposed on the front of the vehicle and oriented to emit a second light beam and project a second dot onto the preceding vehicle such that a width is established between the first and second dots;
   a camera configured to generate a digital image of the first and second dots projected onto the preceding vehicle; and
   a controller configured to determine, from the digital image, the width between the first and second dots, and subsequently determine a following distance between the vehicle and the preceding vehicle based on linear interpolation using the determined width.

2. The vehicle of claim 1, wherein the width between the first and second dot is determined in pixels.

3. The vehicle of claim 1, wherein the first and second lasers are infrared lasers, and wherein the second dot is projected onto the preceding vehicle at a location horizontally adjacent to the first dot.

4. The vehicle of claim 3, wherein the camera is a night vision camera configured to detect infrared light emitted from the first and second infrared lasers.

5. The vehicle of claim 1, wherein the controller determines the following distance based on linear interpolation using the equation $$\frac{X1 - X2}{d2 - d1} = \frac{X1 - X}{d - d1},$$

where 'X' is a number of pixels wide at following distance 'd', 'X1' is a number of pixels wide at a first predetermined range 'd1', 'X2' is a number of pixels wide at a second predetermined range 'd2', 'd' is the following distance to be determined, and 'd1' and 'd2' are the known ranges.

6. The vehicle of claim 1, wherein the controller is a driver assistance system module (DASM) of a driver assistance system, wherein the DASM is in signal communication with the camera and the first and second lasers.

7. The vehicle of claim 6, wherein the DASM is in signal communication with a powertrain control module (PCM), a transmission control module (TCM) and a brake system module (BSM), the DASM configured to utilize the determined following distance to facilitate operation of an adaptive cruise control (ACC) system and/or an automated emergency braking (AEB) system.

8. The vehicle of claim 1, wherein the first and second lasers are respectively positioned adjacent opposite headlights of the vehicle, and the camera is positioned adjacent a rearview mirror of the vehicle.

9. A vehicle comprising:
   a first laser configured to emit a first light beam and project a first dot onto a preceding vehicle;
   a second laser configured to emit a second light beam and project a second dot onto the preceding vehicle;
   a camera configured to generate a digital image of the first and second dots projected onto the preceding vehicle; and
   a controller configured to determine, from the digital image, a width between the first and second dots, and subsequently determine a following distance between the vehicle and the preceding vehicle based on linear interpolation using the determined width,
   wherein the width between the first and second dot is determined in pixels,
   wherein determining the following distance based on linear interpolation further includes using a predetermined second pixel width and second distance, and a predetermined third pixel width and third distance.

10. A method of controlling a vehicle having a driver assist system with first and second lasers disposed on a front of the vehicle and a camera, the method comprising:
    emitting a first beam of light from the first laser to project a first dot onto a preceding vehicle;
    emitting a second beam of light from the second laser to project a second dot onto the preceding vehicle such that a width is established between the first and second dots;
    generating, with the camera, a digital image of the first and second dots projected onto the preceding vehicle;
    determining, with a controller, the width between the first and second dot on the digital image; and
    determining, with the controller, a following distance between the vehicle and the preceding vehicle based on linear interpolation using the determined width.

11. The method of claim 10, wherein the width is determined in pixels.

12. The method of claim 11, wherein the following distance is further determined using a predetermined second pixel width and second distance, and a predetermined third pixel width and third distance.

13. The method of claim 10, wherein the steps of emitting first and second beams of light comprises emitting first and second beams of infrared light, and wherein the second dot is projected onto the preceding vehicle at a location horizontally adjacent to the first dot.

14. The method of claim 10, wherein determining the following distance based on linear interpolation comprises using the equation $$\frac{X1 - X2}{d2 - d1} = \frac{X1 - X}{d - d1},$$

where 'X' is a number of pixels wide at following distance 'd', 'X1' is a number of pixels wide at a first predetermined range 'd1', 'X2' is a number of pixels wide at a second predetermined range 'd2', 'd' is the following distance to be determined, and 'd1' and 'd2' are the predetermined ranges.

15. The method of claim 10, wherein the controller is a driver assistance system module (DASM) of the driver assistance system, wherein the DASM receives one or more digital image from the camera to determine the width between the first and second dot.

16. The method of claim 15, further comprising controlling, with the DASM, at least one of a powertrain control module (PCM), a transmission control module (TCM), and a brake system module (BSM), based on the determined following distance to facilitate operation of at least one of an adaptive cruise control (ACC) system and an automated emergency braking (AEB) system.

* * * * *